Patented July 4, 1950

2,513,558

UNITED STATES PATENT OFFICE 2,513,558

TREATMENT OF HYDROCARBON TYPE DRYING OILS TO EFFECT AN IMPROVEMENT IN THEIR DRYING QUALITIES

Edward M. Geiser, Downers Grove, Ill., assignor to Universal Oil Products Company, Chicago, Ill., a corporation of Delaware No Drawing. Application October 31, 1947, Serial No. 783,457

11 Claims. (Cl. 196—78)

This invention relates to a method of improving the drying properties and other physical characteristics of hydrocarbon type drying oils by a process which comprises modifying the structure of the hydrocarbon molecules comprising said drying oil in a manner of treatment thereof which is believed to effect at least a partial polymerization of the hydrocarbon components present in said drying oil. More specifically, this invention concerns a process for reducing the volatility of the light ends of hydrocarbon drying oils as recovered from conjunct polymerization sludges by the method which comprises treating the crude drying oil with a specific reagent hereinafter more fully characterized and recovering the improved modified drying oil from the sludge resulting in the treatment of said drying oil with said reagent.

It has been heretofore recognized that the highly unsaturated hydrocarbon product recovered from certain catalyst sludges, formed by treatment of hydrocarbons with catalysts characterized by the art as conjunct polymerization catalysts, possesses valuable film-forming properties and dries on exposure to atmospheric oxygen to a tough, hard film having a pronounced resistance to water and alkali. These drying oils which are particularly applicable in the formulation of paint and varnish compositions, capable of replacing at least in part the customary glyceride fatty acid ester drying oils and in many cases possessing properties which give them advantages over the older vegetable and marine drying oils are prepared initially from hydrocarbon charging stocks by a process in which the hydrocarbon charging stocks undergo conjunct polymerization in the presence of a catalyst capable of effecting the latter type of polymerization reaction. The hydrocarbon conjunct polymers may also be recovered from certain sludges ordinarily considered as a waste product in many refining operations in which hydrocarbon charging stocks are converted in the presence of said catalysts having conjunct polymerization properties. The conjunct polymers make their final appearance in the sludge combined by loose chemical bonds or by entrainment with the spent conjunct polymerization catalyst. Typical hydrocarbon conversion processes in which such sludges are formed are the alkylation of isoparaffin hydrocarbons with olefins; the isomerization of paraffinic hydrocarbons; the polymerization of olefin hydrocarbons and a host of other hydrocarbon conversion reactions in which conjunct polymerization catalysts such as substantially anhydrous hydrogen fluoride, sulfuric acid containing not more than from about 10 to about 15% water, anhydrous aluminum chloride and aluminum bromide, anhydrous boron trifluoride and the like are utilized as conversion catalysts. The sludge may also be prepared and for the purpose of consistent quality of the recovered drying oil is preferably prepared by the deliberate reaction at selected reaction conditions of a conjunct polymerization catalyst with an olefin such as the normal olefins containing at least 3 carbon atoms per molecule, the branched chain aliphatic paraffins, the cyclic olefins and naphthenes, and in general any hydrocarbon or mixture thereof no substantial proportion of which is aromatic.

In the conjunct polymerization reaction the charging stock undergoes a series of apparently simultaneous or successive hydrocarbon conversion reactions with the catalyst. Initially on contact of the hydrocarbon charge and catalyst, a dehydrogenation reaction accompanied by a hydrogen transfer reaction occurs between the hydrocarbon molecules contained in the charging stock. Substantially simultaneous with the hydrogen transfer reactions, the resulting unsaturated products thereof are believed to undergo polymerization and/or cyclization, forming thereby higher molecular weight hydrocarbons of which a portion (usually from about 30 to about 70% by weight of the charging stock) form a substantially saturated hydrocarbon phase and the remainder of which, in the form of highly branched chain, predominantly cyclic and polycyclic unsaturated hydrocarbons containing conjugated as well as non-conjugated unsaturation combine by attachment with loose chemical bonds to the residual conjunct polymerization catalyst present in the reaction mixture forming the above referred to sludge from which the present hydrocarbon drying oil utilized as charging stock in the present process is recovered by the treatment hereinafter described. The sludge-forming reaction is ordinarily effected at temperatures within the range of from about —10° to about 100° C., preferably at about room temperature or below depending upon the catalyst utilized and the hydrocarbon charged to the reaction. Pressures sufficiently superatmospheric to maintain both the hydrocarbon charging stock and catalyst in substantially liquid phase are provided during the reaction to ensure intimate contact between catalyst and charging stock. A saturated hydrocarbon product comprising the hydrogenated conjunct polymers formed in the hydrogen transfer stage of the reaction and forming as an upper layer in the reaction mixture when the latter is allowed to stand quiescent for any given length of time is a by-product of the process utilizable as a high octane motor fuel etc.

The desired hydrocarbon drying oil product of the conjunct polymerization reaction comprising the primary charging stock to the present process is recovered from the catalyst-hydrocarbon sludge complex by selectively decomposing the sludge whereby the initial saturated character of the conjunct polymers in the sludge is retained to thereby preserve the rapid drying properties of the oil. In accordance with one method developed by the prior art for decomposing the catalyst-hydrocarbon sludge to release the drying oil hydrocarbons therein, the sludge is hydrolyzed by admixing the same with water or a dilute caustic solution. In this method the catalyst present in the sludge is either hydrolyzed or hydrated and the drying oil hydrocarbons rise to the top of the hydrolysate mixture. In the case of a hydrogen fluoride or a sulfuric acid sludge, the hydrolyzing procedure merely dilutes the acid and when the concentration of acid is reduced to a certain value (to approximately 80% acidity in the case of the hydrogen fluoride or sulfuric acid sludge) the drying oil hydrocarbons are released and form an insoluble hydrocarbon phase over the lower dilute acid phase. The liberated hydrocarbons following the hydrolysis may be withdrawn from the hydrolyzing reactor, dried and separated into fractions, if desired, while the lower layer from the hydrolysis reaction containing diluted or hydrated catalyst may be subjected to distillation or other treatment to reconcentrate the catalyst for recycling to the sludge-forming stage of the process. Other methods for recovering the drying oil hydrocarbons from the conjunct polymerization sludge include treating the sludge thermally to decompose the catalyst-hydrocarbon complexes therein, this method being especially applicable when a volatile conjunct polymerization catalyst is utilized in the preparation of the sludge, such as anhydrous hydrogen fluoride. Since it is desirable for economy purposes to recycle the conjunct polymerization catalyst liberated in the hydrolysis or thermal decomposition methods of treating the sludge, it is generally preferred to utilize substantially anhydrous hydrogen fluoride as catalyst in the conjunct polymerization reaction to form the sludge containing herein described drying oils as a component thereof.

It has been observed that in the utilization of the sludge hydrocarbons as drying oils, the low boiling components of the crude drying oil product as separated from the sludge are too volatile to be utilized under the conditions to which a paint or varnish composition containing the drying oil may be subjected to. By means of the process of this invention, the total drying oil product recovered from the sludge or the low boiling fractions thereof, if desired, may be treated with a catalyst comprising a coordination complex compound of boron trifluoride and a complex-forming compound of the type hereinafter described to thereby increase the molecular weight of the low boiling drying oil hydrocarbons and form hydrocarbons having reduced volatility. It is believed that the action of the boron trifluoride complex on the drying oil hydrocarbons is essentially that of polymerization or copolymerization between the individual molecules of said drying oil hydrocarbons, increasing the molecular weight of the lower boiling components to correspond more nearly to the molecular weight (and hence the volatility) of the higher boiling components of the drying oil. The product resulting in the treatment of the initial, crude drying oil with the boron trifluoride complex possesses drying properties equivalent to or excelling the drying properties of the higher molecular weight components of the original oil. The most outstanding result achieved by the treatment is to convert that portion of the original drying oil product which is lost by evaporation when exposed to atmospheric oxygen into a drying oil which does not vaporize during the drying stage and is therefore not lost to the atmosphere by a process which involves increasing the molecular weight of said drying oil hydrocarbons and otherwise altering their molecular structure to form hydrocarbons having more desirable drying properties and lower volatility. The converted portions, therefore, contribute valuable film-forming properties to coating compositions in which said drying oil is a component and is thus actually used in the composition in the function for which it was intended. The amount of low boiling components vaporizable in the ordinary application of the drying oil as a paint or varnish component may be as high as from about 10 to 25% of the original hydrocarbon drying oil. By means of the present process therefore, the 10 to 25% portion of the crude drying oil originally lost by vaporization is converted into hydrocarbons of sufficiently high boiling point that said hydrocarbons do not readily evaporate, but rather, become fixed by oxidation and polymerization to form a valuable portion of the dried film. The loss of the vaporizable components in the untreated drying oil is especially pronounced when heat is applied to the surface of the coating material to enhance its drying speed.

One of the primary objects of the present process is to effect an improvement in a hydrocarbon type drying oil product recovered from a conjunct polymerization sludge by increasing the molecular weight of the low boiling components of said drying oil hydrocarbons. Another object of the present process is to provide a method of reducing the volatility of the low molecular weight components of a hydrocarbon drying oil, converting said low molecular weight components into hydrocarbons of equal or superior drying ability as compared to higher molecular weight components of the original drying oil.

Still another object of the invention is to effect an economy in the application of coating compositions containing a hydrocarbon drying oil component which are exposed to the atmosphere to obtain drying thereof by treating said hydrocarbon drying oil to increase the molecular weight of its lower boiling fractions and to convert the same into drying oil hydrocarbons which do not readily evaporate, but form a portion of the dried film upon polymerization and oxidation in the presence of atmospheric oxygen.

One embodiment of the present invention concerns a process for increasing the molecular weight and, therefore, the boiling point of a low boiling fraction of a hydrocarbon drying oil recovered from a conjunct polymerization sludge, by the method which comprises heating said fraction in the presence of a boron trifluoride complex catalyst and thereafter removing the modified drying oil hydrocarbon from the resulting boron trifluoride complex sludge.

A more specific embodiment of the invention relates to a process for increasing the utility of the low boiling point fraction of a hydrocarbon drying oil recovered from a conjunct polymerization sludge by reacting a full-boiling drying oil charging stock at a temperature of from about 0° to about 100° C. and at atmospheric pressure for a reaction period generally not exceeding about 6 hours in the presence of a boron trifluoride complex catalyst selected from the group consisting of the boron trifluoride hydrates and from the boron trifluoride addition compounds of certain oxygen-containing organic compounds comprising the alcohols, ethers, ketones, aldehydes, phenols, carboxylic acids and their esters and thereafter recovering from the resulting reaction product of the hydrocarbon drying oil and boron trifluoride complex catalyst a full-boiling drying oil product having an initial boiling point substantially higher than the initial boiling point of the untreated hydrocarbon drying oil charging stock.

Another more specific embodiment of the invention relates to the recovery of a modified drying oil hydrocarbon product formed upon treating a crude hydrocarbon drying oil as recovered from a conjunct polymerization sludge with a boron trifluoride complex catalyst, the recovery of said modified drying oil comprising contacting water with the product of the reaction of said boron trifluoride complex with said crude drying oil hydrocarbon thereby liberating said modified drying oil hydrocarbon product from the boron trifluoride complex.

Other objects and embodiments of the present invention relating to specific factors involved in the present process will be hereinafter referred to in greater detail in the following further description of the invention.

The initial hydrocarbon drying oil charging stock subjected to the treatment herein provided contains a series of high molecular weight cyclic compounds of wide boiling range, but of generally homologous structure which contain conjugated olefinic double bonds, although the exact composition of the fraction will vary somewhat depending upon the particular charging stock, and conjunct polymerization catalyst utilized in its preparation, and the conditions of operation employed. Infra-red and ultra-violet adsorption studies as well as other analytical data determined on the unsaturated hydrocarbon material have shown that the polyenes contained therein are of cyclic structure but are substantially non-aromatic, and have isolated unsaturation in addition to conjugated unsaturation, and that the four carbon atoms which constitute the conjugated system in said hydrocarbons are highly substituted, possessing, on the average, fewer than two hydrogen atoms per mol as substituents. Diolefin units of this nature may be represented by the general formula:

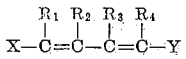

in which X and Y represent other parts of the cyclic polyolefinic molecule such as saturated or unsaturated cyclic hydrocarbon radicals, and $R_1$, $R_2$, $R_3$ and $R_4$ represent substituents such as hydrogen, an alkyl group, an alkenyl group, a cycloparaffin group, a cyclo-olefin group, etc.

Representative unsaturated, polyolefinic, hydrocarbons prepared in typical conjunct polymerization reactions usually have a wide boiling range of from about 150° to over 450° C., density of from about 0.83 to about 0.93, index of refraction of from about 1.47 to about 1.53 (but usually 1.48 to 1.50), specific dispersion of from about 125 to about 175 (but usually between 135 and 145), bromine numbers above about 140 (although they vary considerably with the average molecular weight), maleic anhydride values of from about 30 to about 90 (usually in the range of about 45 to 85), acid number below 3, average number of olefinic double bonds per molecule varying between about 2.5 and about 4, of which from about 40 to about 70 per cent are conjugated, and average molecular weights from about 200 to about 400, although the usual average is in the neighborhood of 300 and may be as high as about 1000. Although hydrogen-to-carbon atomic ratios of the hydrocarbons contained in the unsaturated hydrocarbon fraction vary somewhat, depending upon the particular source of the material, for a fraction derived from a polymer gasoline-hydrogen fluoride sludge they range from about 1.67 to about 1.72 (for the various fractions) with the actual weight percentages of hydrogen varying from about 12.35 to about 12.6.

The catalyst utilized in the present process for modifying the physical characteristics of the hydrocarbon drying oil by increasing the boiling point of the components thereof is broadly specified as a boron trifluoride addition complex catalyst formed by reacting anhydrous boron trifluoride with a complex-forming compound such as water to form a boron trifluoride addition complex of the reactants containing one or two molecular proportions of the complex-forming component per mol of boron trifluoride addition complex. The complexes formed by reacting boron trifluoride with the complex-forming compound are referred to as coordination compounds which theoretically form by virtue of the fact that the boron atom of boron trifluoride possesses only 6 electrons in its outer shell and is capable of combining with an atom having an unshared pair of electrons to form a coordinate covalent (semi-polar) bond. In this manner boron trifluoride reacts with water to form a monohydrate in accordance with the following equation:

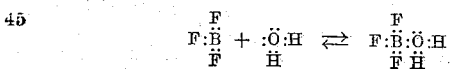

Other complex-forming compounds which may be reacted with boron trifluoride to form the catalyst herein specified are the organic oxygen-containing compounds selected from the group consisting of the aliphatic and aromatic ketones, aldehydes, ethers, alcohols, esters, phenols and carboxylic acids, preferably from the lower molecular weight compounds of this group generally containing fewer than about 8 carbon atoms per molecule. The coordination complex catalyst may be prepared by simply mixing water or the organic oxygen-containing compound with anhydrous boron trifluoride until at least one, and preferably two, molecular proportions of the addendum compound has been introduced into the reaction mixture. The formation of the coordination complex catalyst is an exothermic reaction and is preferably maintained at a temperature of from about 30° to about 100° C. by cooling the reaction mixture during the addition of the complex-forming compound. The mono-addition coordination complex containing one molecule of the complex-forming compound in the resulting boron trifluoride coordination complex is formed by reacting additional boron trifluoride with the di-addition complex containing 2 molecules of the complex-forming compound per molecule of boron trifluoride. Either the mono- or di-addition complex may be utilized in the present process, although the di-compound is preferred because of its relatively greater stability, a particularly preferred boron trifluoride complex catalyst being the dihydrate which contains two molecular proportions of water per molecule of complex and one molecular proportion of boron trifluoride.

Typical representative organic oxygen-containing compounds which yield the boron trifluoride coordination complex catalyst herein provided are such ethers as dimethylether, methylethylether, diethylether, methyl-n-propyl ether, methylisopropyl ether, and their homologs containing fewer than about 8 carbon atoms per molecule. Of the carboxylic acids utilizable in the formation of the coordination complex, the aliphatic acids such as acetic acid, propionic acid, normal butyric acid, valeric acid, etc., are typical of this class of compounds, alcohols such as methanol, ethanol, propanol, butanol, etc.; phenols, as for example, phenol itself, cresol, alpha naphthol; and tertiary butylphenol; ketones, such as acetone, ethylmethylketone, diethylketone, etc.; aldehydes, such as acetaldehyde, propionaldehyde, butyraldehyde, etc.; esters, such as methylformate, methylacetate, ethylacetate, etc. represent typical complex-forming compounds utilizable in the formation of the boron trifluoride coordination complex catalyst.

The process of the present invention whereby an unsaturated hydrocarbon drying oil of the type recovered from a conjunct polymerization sludge is reacted with a catalyst consisting of a boron trifluoride coordination complex is effected at atmospheric or superatmospheric pressures sufficient to maintain the reactants in liquid phase, generally, from about one atmosphere to about 20 atmospheres and at a temperature of from about 0° to about 100° C., preferably from about 30 to about 90° C. The ratio of catalyst to hydrocarbon charging stock is generally maintained at a weight ratio of catalyst to hydrocarbons of from about 0.01 to about 10, the weight ratio being somewhat lower in the case of utilizing the mono-addition coordination complex of boron trifluoride as catalyst compared to the use of the di-addition complex therefor. The period of contact of the catalyst and crude drying oil hydrocarbon charge at temperatures within the above range may be from several minutes to several hours, depending upon the nature of the catalyst, the degree of reaction desired, and particularly the character of the hydrocarbon charge, the contact period generally being not less than about 10 minutes and not in excess of about 6 hours, preferably from about 30 minutes to about 3 hours. It is to be emphasized, however, that conversion of the charge proceeds immediately upon contact with the coordination complex catalyst so that even after as short a contact period as one minute, appreciable conversion may result, depending upon the temperature. The speed of reaction may also be modified by diluting the crude drying oil charging stock with a suitable inert diluent, such as a paraffinic hydrocarbon maintained in liquid phase. The diluent may be separated from the product, for example, by distillation following the treatment. The reaction produces a sludge of the complex catalyst and drying oil hydrocarbons which generally appears as a homogeneous reaction product and which may be decomposed to liberate the modified drying oil by the addition of water thereto or by countercurrently extracting the boron trifluoride catalyst from the modified drying oil. An inert atmosphere of nitrogen, carbon dioxide, carbon monoxide or other gases containing little or no oxygen is desirably maintained above the surface of the reaction mixture during the operation, especially when long contact periods are employed to effect the conversion.

The generally homogeneous reaction mixture formed on contacting the boron trifluoride complex catalyst with the hydrocarbon drying oil charge may be treated by various means to decompose the resulting sludge to liberate the modified drying oil. As indicated, the decomposition may be effected by hydrolyzing the sludge and this is considered to be the preferred and most convenient method. The hydrolysis is obtained by mixing the boron trifluoride drying oil hydrocarbon sludge with from about 0.5 to about 10 volumes of water, preferably with a minimum volume of water, especially when the aqueous phase separating from the reaction mixture is to be treated, for example by distillation, to recover the boron trifluoride and/or the complex-forming component of the catalyst. In the latter instance it becomes desirable to have as little water present in the aqueous phase as possible to reduce the amount of water to be removed to form an anhydrous distillate. The hydrolysis of the boron trifluoride complex sludge forms a 2-phase system, the upper phase comprising the modified drying oil which may be withdrawn for further treatment and a lower aqueous phase containing the catalyst in hydrolyzed form. The drying oil is ordinarily dried, as for example, by distillation or by suspending the oil above a dehydrating material, and may thereafter be fractionated to recover preferred boiling range fractions for utilization as drying oils. The fractionation is preferably conducted at subatmospheric pressures, desirably below about 100 mm. mercury absolute.

Another method of decomposing the reaction product of the present process containing the boron trifluoride coordination complex sludge with the modified hydrocarbon drying oil comprises heating the sludge to vaporize the sludge components and fractionally separating the resulting vapors. The operation may be effected by a vacuum distillation procedure to enhance the vaporization of the components from the sludge at a lower temperature. The thermal method of decomposition represented by the above specified distillation treatment is not, however, a preferred method of recovering the modified drying oil product because of the formation of tarry substances inherent in the procedure which occurs even though vacuum distillation is utilized.

The process of this invention may be effected on either a continuous or batch basis, the product resulting from either method being similar but the continuous method generally providing for larger scale operation. In a typical batch process, the hydrocarbon drying oil charging stock is introduced into a pre-determined quantity of the boron trifluoride complex catalyst, desirably as the reaction mixture is stirred or otherwise agitated to effect intimate contact between the reactants. After the required contact period, the reaction mixture may be dumped into water or water added thereto and the resulting two-phase system separated. In a continuous process, a stream of the liquid boron trifluoride complex catalyst is admixed in a suitable conduit with a stream of the crude hydrocarbon drying oil charging stock to result in the desired proportion of reactants and the mixture allowed to circulate through a heater for the required contact period following which the stream may be concurrently extended with a stream of water to effect hydrolysis of the reaction product and the resulting aqueous and hydrocarbon phases separated.

The modified drying oil product is similar in structure to the hydrocarbon drying oil charging stock except that the hydrocarbon components thereof are generally of higher molecular weight, presumably because of additional alkyl and hydrogen transfer reactions during the process as well as a certain degree of polymerization between the hydrocarbons present in the reaction mixture. As previously indicated, the increased molecular weight of the product reduces its volatility without impairing its drying properties. The modified product, in fact, dries to a less brittle, more flexible film upon exposure to atmospheric oxygen than the original hydrocarbon drying oil charging stock. Because of the reduced volatility of the drying oil, a given quantity of the modified product forms a thicker dried film due to a greater proportion of the material combining with atmospheric oxygen and polymerizing to form said dried film.

The present process is further illustrated by reference to the following example which describes a typical embodiment of the invention. The example, however, is not to be interpreted as limiting the generally broad scope of the invention in accordance therewith but is introduced for the purpose of merely illustrating the process with reference to a particular charging stock, catalyst, and method of operation.

A hydrogen fluoride sludge was prepared by reacting liquefied, substantially anhydrous hydrogen fluoride with a codimer gasoline fraction having an initial boiling point of about 45° C. and an end boiling point of about 266° C., containing various olefins having from about 5 to about 15 carbon atoms per molecule. Two liters of the gasoline fraction were added gradually under pressure and with stirring to 800 grams of liquefied substantially anhydrous hydrogen fluoride in a closed, stirred pressure autoclave. Stirring was continued for one hour at a temperature of from about 90° to about 95° C. and at a pressure of about 250 p. s. i. gage, followed by cooling the reactor and its contents to approximately 0° C. in an ice bath. The liquid products separated into two layers on standing, an upper, substantially hydrocarbon phase which was removed by decantation, and a lower layer containing substantially all of the hydrogen fluoride charged to the reactor. The lower layer as separated above comprised the hydrogen fluoride sludge from which the crude drying oil hydrocarbons hereinafter characterized was separated in accordance with the following procedure.

The above hydrogen fluoride sludge containing approximately 57% hydrogen fluoride and 43% hydrocarbon was a fluid, homogeneous straw-colored liquid which fumed profusely of hydrogen fluoride when exposed to the atmosphere. The sludge was gradually run into a hydrolyzing vessel containing twice its volume of cracked ice. The sludge hydrolyzing reaction was exothermic resulting in the liberation of a hydrocarbon phase which collected as an upper layer in the hydrolyzing vessel above a lower dilute aqueous solution of hydrofluoric acid. The upper hydrocarbon layer was decanted, shaken with a dilute aqueous solution of sodium hydroxide to neutralize any residual hydrofluoric acid therein, decanted from the aqueous phase, and dried over anhydrous sodium sulfate. The yield of the crude drying oil product comprising the hydrocarbon phase separated in the hydrolyzing reaction above was 40% based upon the original hydrocarbon charge. The crude product had the following properties:

| | |
|---|---|
| Average molecular weight, cryoscopic | 290 |
| Bromine number | 181 |
| Dine number (maleic anhydride value) | 82 |
| $d_4^{20}$ | 0.859 |
| $n_D^{20}$ | 1.4846 |
| Gardner color | 11–12 |
| Boiling range, °C | 170–450 |

The above drying oil product was fractionally distilled to separate a fraction therefrom boiling from about 200° to about 240° C. 50 grams of the above fraction was contacted with 5 grams (10 weight per cent) of a boron trifluoride-ethylether complex for 5 hours at a temperature of approximately 71° C. in a pressure autoclave containing an inert atmosphere of nitrogen at a pressure of about 200 p. s. i. gage. At the end of the above reaction period, the autoclave was cooled and the contents washed with distilled water to remove the boron trifluoride etherate catalyst. The upper hydrocarbon layer separated during the above washing procedure was dried over anhydrous sodium sulfate and distilled under reduced pressure (100 mm. Hg absolute). Approximately 24% of the original charge boiled within the range of from about 195° to about 240° C. (the boiling range of the originally charged fraction) and approximately 61% of the product, based upon the weight of original drying oil charge, boiled above 240° C., up to about 400° C. The fraction boiling above 240° C. had a bromine number varying from about 261 for the lowest boiling fractions thereof to about 229 for the highest boiling fractions, a diene number of from about 96 to about 58 for the corresponding fractions, a refractive index of 1.4754 to 1.5060 and a molecular weight range of from about 292 to about 366 for said fractions.

It is apparent from the above results that not only the boiling range (and therefore also the molecular weight) of the original charge was increased but, further, the diene number of the hydrocarbons contained therein (usually a direct indication of its degree of unsaturation and roughly an indication of its drying power when exposed to atmospheric oxygen) was measurably increased. The original charge to the modifying reaction boiling entirely within the range of from about 200° to about 240° C. was converted into an improved drying oil which contained only approximately 23% of hydrocarbons boiling within the original range and over 61% of hydrocarbons boiling above the original boiling range.

I claim as my invention:

1. A process for modifying the properties of a hydrocarbon drying oil recovered from a conjunct polymerization sludge and containing hydrocarbons boiling below 250° C. which comprises contacting said drying oil with a boron trifluoride complex catalyst selected from the group consisting of a boron trifluoride hydrate and a complex addition compound of boron trifluoride with an oxygen-containing organic compound, said process being effected at reaction conditions sufficient to maintain the reactants in substantially liquid phase and thereafter separating the resulting modified hydrocarbon drying oil from the sludge formed by the reaction of said boron trifluoride addition complex and the originally charged hydrocarbon drying oil.

2. A process for increasing the boiling point of a hydrocarbon drying oil recovered from a conjunct polymerization sludge and containing hydrocarbons boiling below 250° C. which comprises contacting said drying oil with a boron trifluoride complex catalyst selected from the group consisting of a boron trifluoride hydrate and a complex addition compound of boron trifluoride with an oxygen-containing organic compound at a temperature of from about 0° to about 100° C. for a reaction period of from about 10 minutes to about 6 hours and at a pressure sufficient to maintain the reactants in substantially liquid phase and thereafter separating the resulting modified hydrocarbon drying oil from the sludge formed by the reaction of said boron trifluoride addition complex and the hydrocarbon drying oil originally charged.

3. The process of claim 2 further characterized in that said boron trifluoride complex catalyst is a boron trifluoride dihydrate.

4. The process of claim 2 further characterized in that said boron trifluoride complex catalyst is a boron trifluoride addition complex of an ether.

5. A process for reducing the volatility of a low boiling fraction boiling below 250° C. separated from the full boiling range hydrocarbon drying oil product recovered from a conjunct polymerization sludge which comprises contacting said fraction with a boron trifluoride complex catalyst selected from the group consisting of a boron trifluoride hydrate and a complex addition compound of boron trifluoride with an oxygen-containing organic compound and thereafter separating the resulting modified hydrocarbon drying oil having a higher boiling range than the original low boiling fraction charged to the process from the sludge formed by the reaction of said boron trifluoride addition complex and the originally charged hydrocarbon drying oil fraction.

6. The process of claim 5 further characterized in that said hydrocarbon drying oil product recovered from a conjunct polymerization sludge is contacted with said boron trifluoride complex catalyst in the presence of an inert diluent.

7. A process for increasing the boiling point range of the fraction boiling below about 250° C. of a hydrocarbon drying oil product recovered from a conjunct polymerization sludge which comprises contacting said drying oil with a boron trifluoride complex catalyst selected from the group consisting of a boron trifluoride hydrate and a complex addition compound of boron trifluoride with an oxygen-containing organic compound, said process being effected at reaction conditions sufficient to maintain the reactants in substantially liquid phase and thereafter separating the resulting modified hydrocarbon drying oil from the sludge formed by the reaction of said boron trifluoride addition complex and the originally charged hydrocarbon drying oil fraction.

8. A process for modifying the properties of a hydrocarbon drying oil recovered from a conjunct polymerization sludge which comprises contacting said drying oil with a complex addition compound of boron trifluoride with an oxygen-containing organic compound containing fewer than about 8 carbon atoms per molecule, said process being effected at reaction conditions sufficient to maintain the reactants in substantially liquid phase and thereafter separating the resulting modified hydrocarbon drying oil from the sludge formed by the reaction of said boron trifluoride addition complex and the originally charged hydrocarbon drying oil.

9. The process of claim 8 further characterized in that said boron trifluoride addition complex of an oxygen containing organic compound is a boron trifluoride-ethyl ether complex.

10. A process for modifying the properties of a hydrocarbon drying oil recovered from a conjunct polymerization sludge and containing hydrocarbons boiling below 250° C. which comprises contacting said drying oil with a boron trifluoride complex catalyst selected from the group consisting of a boron trifluoride hydrate and a complex addition compound of boron trifluoride with an oxygen-containing organic compound, said process being effected at reaction conditions sufficient to maintain the reactants in substantially liquid phase and thereafter washing the sludge formed by the reaction of said boron trifluoride addition complex with the hydrocarbon drying oil originally charged with water to liberate the resulting modified hydrocarbon drying oil product and separating said hydrocarbon drying oil from the resulting aqueous phase.

11. A process for modifying the properties of a hydrocarbon drying oil recovered from a conjunct polymerization sludge which comprises contacting said drying oil with a boron trifluoride ethyl ether complex at a temperature of from about 70 to about 80° C., at a pressure sufficient to maintain the reactants in substantially liquid phase for a reaction period of approximately 5 hours, thereafter adding the resulting reaction mixture to water, thereby hydrolyzing the sludge containing the boron trifluoride addition complex sludge and the hydrocarbon drying oil product, liberating a modified hydrocarbon drying oil product and separating said modified drying oil from the resulting aqueous phase.

EDWARD M. GEISER.

REFERENCES CITED

The following references are of record in the file of this patent:

UNITED STATES PATENTS

| Number | Name | Date |
| --- | --- | --- |
| 1,811,130 | Hofman et al. | June 23, 1931 |
| 2,220,307 | Whiteley et al. | Nov. 5, 1940 |
| 2,325,891 | Viland | Aug. 3, 1943 |
| 2,354,554 | Showalter et al. | July 25, 1944 |
| 2,379,656 | Ruthruff | July 3, 1945 |
| 2,413,310 | Bloch | Dec. 31, 1946 |
| 2,440,477 | Johnstone | Apr. 27, 1948 |